US012759926B2

(12) United States Patent
Aitoku et al.

(10) Patent No.: US 12,759,926 B2
(45) Date of Patent: Oct. 13, 2026

(54) POROUS GLASS MEMBER

(71) Applicant: NIPPON ELECTRIC GLASS CO., LTD., Otsu (JP)

(72) Inventors: Takashi Aitoku, Otsu (JP); Masato Tsujiguchi, Otsu (JP); Motoshi Iwanaga, Otsu (JP)

(73) Assignee: NIPPON ELECTRIC GLASS CO., LTD, Shiga (JP)

( * ) Notice: Subject to any disclaimer, the term of this patent is extended or adjusted under 35 U.S.C. 154(b) by 872 days.

(21) Appl. No.: 17/920,856

(22) PCT Filed: Jun. 21, 2021

(86) PCT No.: PCT/JP2021/023407

§ 371 (c)(1),
(2) Date: Jun. 6, 2023

(87) PCT Pub. No.: WO2022/014268

PCT Pub. Date: Jan. 20, 2022

(65) Prior Publication Data

US 2023/0286853 A1 Sep. 14, 2023

(30) Foreign Application Priority Data

Jul. 13, 2020 (JP) ................................ 2020-119614

(51) Int. Cl.
*C03C 3/085* (2006.01)
*C03C 11/00* (2006.01)

(52) U.S. Cl.
CPC .............. *C03C 3/085* (2013.01); *C03C 11/00* (2013.01)

(58) Field of Classification Search
CPC .......... C03C 3/085; C03C 11/00; B01D 69/00
See application file for complete search history.

(56) References Cited

U.S. PATENT DOCUMENTS

| | | | | |
|---|---|---|---|---|
| 2013/0003096 | A1 | 1/2013 | Zhang et al. | |
| 2013/0216775 | A1 | 8/2013 | Sugiyama et al. | |
| 2013/0224494 | A1 | 8/2013 | Kotani et al. | |
| 2013/0273320 | A1* | 10/2013 | Bockmeyer | C03C 8/02 428/147 |
| 2014/0305166 | A1 | 10/2014 | Koketsu et al. | |
| 2014/0313391 | A1 | 10/2014 | Zhang et al. | |
| 2021/0047229 | A1 | 2/2021 | Tsujiguchi et al. | |

FOREIGN PATENT DOCUMENTS

| | | | |
|---|---|---|---|
| CN | 102854703 | A | 1/2013 |
| CN | 103221356 | A | 7/2013 |
| JP | 62-007132 | B2 | 2/1987 |
| JP | 10-59742 | A | 3/1998 |
| JP | 2006-193341 | A | 7/2006 |
| JP | 4951799 | B2 | 6/2012 |
| JP | 2012-131694 | A | 7/2012 |
| JP | 2013-033225 | A | 2/2013 |
| JP | 2013-203554 | A | 10/2013 |
| JP | 6080349 | B2 | 2/2017 |
| WO | 2020/013005 | A1 | 1/2020 |

OTHER PUBLICATIONS

JP2013203554A—machine translation (Year: 2012).*
Official Communication issued in corresponding Chinese Patent Application No. 202180031686.9, mailed on February 2. 2024.
Official Communication issued in International Patent Application No. PCT/JP2021/023407, mailed on Sep. 7, 2021.

* cited by examiner

*Primary Examiner* — Cameron K Miller
(74) *Attorney, Agent, or Firm* — Keating & Bennett, LLP

(57) ABSTRACT

Provided is an alkali-resistant porous glass member suitable as a gas sensor element. A porous glass member contains, in terms of % by mass, over 0% $ZrO_2$+$TiO_2$+$Al_2O_3$+BeO+$Cr_2O_3$+$Ga_2O_3$+$CeO_2$ and has a light transmittance of over 1% at any one of wavelengths from 200 to 2600 nm at a thickness of 0.5 mm.

8 Claims, No Drawings

POROUS GLASS MEMBER

TECHNICAL FIELD

The present invention relates to porous glass members.

BACKGROUND ART

Porous glass has a sharp pore distribution and a large specific surface area and also has light permeability and chemical resistance and, therefore, its use in a wide range of applications, including a separation membrane, an electrode material, and a catalyst support, is under consideration. Porous glass may be required to have alkaline resistance depending on use application. Alkali-resistant porous glass is produced by thermally treating a glass base material made of alkali borosilicate glass containing zirconia to separate it into two phases: a silica-rich phase and a boron oxide-rich phase, and removing the boron oxide-rich phase with an acid (see, for example, Patent Literatures 1 and 2).

CITATION LIST

Patent Literature

[PTL 1]
JP-B-S62-7132
[PTL 2]
JP-B2-4951799
[PTL 3]
JP-B2-6080349

SUMMARY OF INVENTION

Technical Problem

Porous glass is expected to be used as a support that supports a functional pigment in its pores. For example, porous glass supporting therein a functional pigment capable of changing the absorbance by reaction with gas is under consideration for application to a gas sensor. On the other hand, the alkali-resistant porous glass described in Patent Literatures 1 and 2 and produced from a glass base material made of alkali borosilicate glass containing zirconia is assumed to be used as a physical separation substrate, and these patent literatures do not at all describe a suitable structure of the porous glass when used as a gas sensor element.

In view of the foregoing, the present invention has an object of providing an alkali-resistant porous glass member suitable as a gas sensor element.

Solution to Problem

The inventors conducted intensive studies and, as a result, found that the above challenge can be solved by a porous glass member having a particular glass composition and a particular light transmission property.

Specifically, a porous glass member according to the present invention contains, in terms of % by mass, over 0% $ZrO_2+TiO_2+Al_2O_3+BeO+Cr_2O_3+Ga_2O_3+CeO_2$ and has a light transmittance of over 1% at any one of wavelengths from 200 to 2600 nm at a thickness of 0.5 mm. In the present invention, "x+y+ . . . " means the total content of components. Here, the porous glass member need not necessarily contain all of the described components as essential components and may not contain one or some of the components (that is, the content of the one or some of the components may be 0%). The light transmittance in the present invention means the linear transmittance.

The porous glass member according to the present invention preferably contains, in terms of % by mass, over 0% $ZrO_2+TiO_2+Al_2O_3$.

The porous glass member according to the present invention preferably has a light transmittance of over 1% at any one of wavelengths from 350 to 450 nm at a thickness of 0.5 mm.

The porous glass member according to the present invention preferably has a light transmittance of over 1% at any one of wavelengths from 350 to 800 nm at a thickness of 0.5 mm.

The porous glass member according to the present invention preferably has a light transmittance of 0.1% or more at a wavelength of 400 nm at a thickness of 0.5 mm.

The porous glass member according to the present invention preferably has a scaffold diameter of 1 to 45 nm. Thus, light scattering in the near-ultraviolet range can be reduced and, therefore, the light transmittance in this range can be increased. The "scaffold diameter" can be calculated from the following equation (1).

$$\text{Scaffold diameter}=(\text{pore diameter})\times[(\pi^{1/2}\times 3^{-5/4}\times 2^{-1/2}\times(\text{porosity})^{-1/2})-1] \quad (1)$$

The "pore diameter" in the equation (1) can be measured with a commercially available pore size distribution measurement device and the median value of a pore size distribution obtained by the measurement is adopted as the pore diameter. The "porosity" can be calculated from the following equation (2).

$$\text{Porosity}=(\text{pore volume})/[(\text{pore volume})+(\text{scaffold volume})] \quad (2)$$

The "pore volume" in the equation (2) can be determined by the nitrogen absorption method. The "scaffold volume" can be determined from the weight and true density of the porous glass member.

The porous glass member according to the present invention preferably contains, in terms of % by mass, 50 to less than 100% $SiO_2$, over 0 to 30% $ZrO_2$, and 0 to 10% $Al_2O_3$.

The porous glass member according to the present invention preferably has a pore diameter of 1 to 50 nm.

The porous glass member according to the present invention is preferably applied for sensing using an absorbance change at a wavelength of 350 to 450 nm.

A porous glass member according to the present invention has an amount of weight reduction per specific surface area of less than 3 $mg/m^2$ after being immersed into a 0.5 N sodium hydroxide aqueous solution at 80° C. for twenty minutes and has a light transmittance of over 1% at any one of wavelengths from 200 to 2600 nm at a thickness of 0.5 mm.

A porous glass member according to the present invention has an amount of weight reduction per specific surface area of less than 3 $mg/m^2$ after being immersed into a 0.5 N sodium hydroxide aqueous solution at 80° C. for twenty minutes, has a scaffold diameter of 1 to 45 nm, and has a pore diameter of 1 to 50 nm.

A porous glass member according to the present invention contains, in terms of % by mass, over 0% $ZrO_2+TiO_2+Al_2O_3+BeO+Cr_2O_3+Ga_2O_3+CeO_2$, has a scaffold diameter of 1 to 45 nm, and has a pore diameter of 1 to 50 nm.

A sensor element according to the present invention includes: any one of the above-described porous glass members; and a functional pigment supported in pores in the porous glass member.

In the sensor element according to the present invention, the functional pigment is preferably vanillin and/or a vanillin derivative.

Advantageous Effects of Invention

The present invention enables provision of an alkali-resistant porous glass member suitable as a gas sensor element.

DESCRIPTION OF EMBODIMENTS (Porous Glass Member)

A porous glass member according to the present invention contains $ZrO_2$, $TiO_2$, $Al_2O_3$, BeO, $Cr_2O_3$, $Ga_2O_3$ or $CeO_2$ as an essential component. By containing these components, the porous glass member can increase the alkaline resistance. The content of $ZrO_2+TiO_2+Al_2O_3+BeO+Cr_2O_3+Ga_2O_3+CeO_2$ is, in terms of % by mass, preferably over 0%, more preferably 2% or more, still more preferably 4% or more, and particularly preferably 6% or more. If the content of $ZrO_2+TiO_2+Al_2O_3+BeO+Cr_2O_3+Ga_2O_3+CeO_2$ is too small, this makes it difficult for the porous glass member to obtain a desired alkaline resistance. On the other hand, if the content of these components is too large, a glass base material is likely to devitrify and less likely to undergo phase separation in the production process of the porous glass member. Therefore, the content of $ZrO_2+TiO_2+Al_2O_3+BeO+Cr_2O_3+Ga_2O_3+CeO_2$ is preferably not more than 30%, more preferably not more than 27%, and particularly preferably not more than 25%.

Among the above components, $ZrO_2$, $TiO_2$, and $Al_2O_3$ are highly effective in increasing the alkaline resistance. Therefore, the porous glass member more preferably contains any of these components as an essential component or components. Specifically, the content of $ZrO_2+TiO_2+Al_2O_3$ is, in terms of % by mass, preferably over 0%, more preferably 2% or more, still more preferably 4% or more, and particularly preferably 6% or more, preferably 30% or less, more preferably 27% or less, and particularly preferably 25% or less. Furthermore, in containing any two components of $ZrO_2$, $TiO_2$, and $Al_2O_3$ into the porous glass member, the total content of them is, in terms of % by mass, preferably over 0%, more preferably 2% or more, still more preferably 4% or more, and particularly preferably 6% or more, preferably 30% or less, more preferably 27% or less, and particularly preferably 25% or less.

Particularly among $ZrO_2$, $TiO_2$, and $Al_2O_3$, $ZrO_2$ has the most significant effect of increasing the alkaline resistance. Therefore, the porous glass member still more preferably contains $ZrO_2$ as an essential component. Specifically, the content of $ZrO_2$ is, in terms of % by mass, preferably over 0%, more preferably 2% or more, still more preferably 4% or more, and particularly preferably 6% or more, preferably 30% or less, more preferably 27% or less, and particularly preferably 25% or less.

The content of $Al_2O_3$ is, in terms of % by mass, preferably 0 to 20%, more preferably over 0 to 15%, and particularly preferably 1 to 10%. If the content of $Al_2O_3$ is too large, the melting temperature is likely to increase to decrease meltability.

The content of $TiO_2$ is, in terms of % by mass, preferably 0 to 20%, more preferably over 0 to 15%, and particularly preferably 1 to 10%. If the content of $TiO_2$ is too large, the glass is likely to be colored and therefore decrease the visible light transmittance.

The alkaline resistance of the porous glass member according to the present invention can be evaluated by the amount of weight reduction under specified conditions. Specifically, the porous glass member according to the present invention preferably has an amount of weight reduction per specific surface area of less than 3 $mg/m^2$ after being immersed into a 0.5 N sodium hydroxide aqueous solution at 80° C. for twenty minutes.

The porous glass member according to the present invention contains $SiO_2$ in an amount of, in terms of % by mass, preferably 50% or more, more preferably 54% or more, still more preferably 60% or more, yet still more preferably 70% or more, even more preferably 80% or more, and particularly preferably 85% or more. If the content of $SiO_2$ is too small, the alkaline resistance, weather resistance, and mechanical strength of the porous glass are likely to decrease. The upper limit of the content of $SiO_2$ is not particularly limited, but is less than 100%, preferably not more than 99%, and particularly preferably not more than 98% in consideration of the contents of the other components.

The porous glass member may contain, aside from the above components, in terms of % by mass, 0 to 15% (preferably 1 to 10%) $Na_2O$, 0 to 10% (preferably over 0 to 5%) $K_2O$, 0 to 10% (preferably over 0 to 10% and particularly preferably 0.05 to 8%) $P_2O_5$, and 0 to 20% (preferably over 0 to 15%) RO (where R represents at least one selected from among Mg, Ca, Sr, and Ba). These components are derived from components contained in a glass base material for use in producing a porous glass.

The porous glass member according to the present invention has, at any one of wavelengths from 200 to 2600 nm at a thickness of 0.5 mm, a light transmittance of preferably over 1%, more preferably 3% or more, still more preferably 5% or more, yet still more preferably 8% or more, even more preferably 10% or more, even yet more preferably 30% or more, and particularly preferably 50% or more. Thus, the porous glass member can be used as a gas sensor element using an absorbance change. On the other hand, the upper limit of the light transmittance is not particularly limited, but is, actually, not more than 99% or not more than 95%.

The porous glass member according to the present invention has, at any one of wavelengths from 350 to 800 nm at a thickness of 0.5 mm, a light transmittance of preferably over 1%, more preferably 3% or more, still more preferably 5% or more, yet still more preferably 8% or more, even more preferably 10% or more, even yet more preferably 30% or more, and particularly preferably 50% or more. Thus, the porous glass member can be used as a gas sensor element using an absorbance change in a near-ultraviolet to visible light range. On the other hand, the upper limit of the light transmittance is not particularly limited, but is, actually, not more than 99% or not more than 95%. It is more preferred that the light transmittance in the entire wavelength range of 350 to 800 nm satisfies the above range.

The porous glass member according to the present invention has, at any one of wavelengths from 350 to 450 nm at a thickness of 0.5 mm, a light transmittance of preferably over 1%, more preferably 3% or more, still more preferably 5% or more, yet still more preferably 8% or more, even more preferably 10% or more, even yet more preferably 30% or more, and particularly preferably 50% or more. The porous glass member significantly exhibits light scattering derived from its porous structure, particularly for short-wavelength light. Therefore, the porous glass member having an excellent light transmission property in a range of 350 to 450 nm can be applied for sensing (for example, as a gas sensor element) using an absorbance change in a near-ultraviolet to visible light range, particularly in the near-ultraviolet range. On the other hand, the upper limit of the light transmittance is not particularly limited, but is, actually, not more than 99% or not more than 95%. It is more preferred that the light transmittance in the entire wavelength range of 350 to 450 nm satisfies the above range.

The porous glass member according to the present invention has, at a wavelength of 400 nm at a thickness of 0.5 mm, a light transmittance of preferably 0.1% or more, more preferably 1% or more, still more preferably 3% or more, yet still more preferably 5% or more, even more preferably 8% or more, even yet more preferably 10% or more, even yet still more preferably 20% or more, further more preferably 30% or more, and particularly preferably 40% or more. The porous glass member significantly exhibits light scattering derived from its porous structure, particularly for short-wavelength light. Therefore, the porous glass member having an excellent light transmission property at a wavelength of 400 nm can be applied for sensing (for example, as a gas sensor element) using an absorbance change in a near-ultraviolet to visible light range, particularly in the near-ultraviolet range. On the other hand, the upper limit of the light transmittance is not particularly limited, but is, actually, not more than 99% or not more than 95%.

The porous glass member according to the present invention has a scaffold diameter of preferably 1 to 45 nm, more preferably 5 to 40 nm, still more preferably 10 to 35 nm, yet still more preferably 12 to 30 nm, and particularly preferably 15 to 25 nm. If the scaffold diameter is too small, the mechanical strength of the porous glass member is likely to decrease. On the other hand, if the scaffold diameter is too large, light scattering inside the porous glass member becomes significant and the light transmittance tends to decrease. The scaffold diameter can be adjusted by the composition of the glass base material for the porous glass member, the thermal treatment conditions, the acidic treatment conditions, the alkaline treatment conditions, and so on.

The porous glass member according to the present invention preferably has a pore diameter of 1 to 50 nm. If the pore diameter is too small, the porous glass member deteriorates in gas permeability and is therefore difficult to use as a gas sensor element. In addition, if the pore diameter is small, the scaffold diameter also tends to be small. As a result, the strength of the glass scaffold decreases, which makes the porous glass member likely to crack. On the other hand, if the pore diameter is too large, the specific surface area of the pores becomes small and, thus, the number of gas absorption sites becomes small. In addition, the transmittance decreases, which makes it difficult to check for a color reaction due to gas absorption. Therefore, also when the pore diameter is too large, the porous glass member is difficult to use as a gas sensor element. The lower limit of the pore diameter is preferably not less than 3 nm, more preferably not less than 4 nm, still more preferably not less than 5 nm, yet still more preferably not less than 6 nm, even more preferably not less than 7 nm, even still more preferably not less than 8 nm, even yet still more preferably not less than 10 nm, further more preferably not less than 15 nm, and particularly preferably not less than 20 nm. On the other hand, the upper limit of the pore diameter is preferably not more than 48 nm, more preferably not more than 46 nm, and particularly preferably not more than 45 nm. The pores have various shapes, including a continuum of perfect spheres, a continuum of approximately ellipsoids, and a tubular shape.

(Production Method of Porous Glass Member)

Porous glass according to the present invention can be obtained, for example, by thermally treating a glass base material to separate it into two phases: a silica-rich phase and a boron oxide-rich phase, and removing the boron oxide-rich phase with an acid. Examples of the glass base material include those containing, in terms of % by mole, 40 to 80% $SiO_2$, over 0 to 40% $B_2O_3$, 0 to 20% $Li_2O$, 0 to 20% $Na_2O$, 0 to 20% $K_2O$, 0 to 2% $P_2O_5$, over 0 to 30% $ZrO_2+TiO_2+Al_2O_3+BeO+Cr_2O_3+Ga_2O_3+CeO_2$, and 0 to 20% RO (where R represents at least one selected from among Mg, Ca, Sr, and Ba). The following description is given of the reasons why the content of each component of the glass base material is specified as just described. In the following description of the respective contents of components, "%" refers to "% by mole" unless otherwise specified.

$SiO_2$ is a component that forms a glass network. The content of $SiO_2$ is preferably 40 to 80%, more preferably 45 to 75%, still more preferably 47 to 60%, and particularly preferably 50 to 65%. If the content of $SiO_2$ is too small, the weather resistance and mechanical strength of the porous glass member tend to decrease. Additionally, in the production process, the amount of expansion due to hydration of silica gel is likely to be smaller than the amount of contraction due to elution of alkaline components, such as $Na_2O$, from a silica-rich phase, which makes it likely that the porous glass member breaks. On the other hand, if the content of $SiO_2$ is too large, the glass base material is less likely to undergo phase separation and the porous glass member is less likely to be etched.

$B_2O_3$ is a component that forms a glass network and promotes phase separation. The content of $B_2O_3$ is preferably over 0 to 40%, more preferably 10 to 30%, and particularly preferably 15 to 25%. If the content of $B_2O_3$ is too large, the weather resistance of the glass base material is likely to decrease.

$Li_2O$ is a component that decreases the melting temperature to improve meltability and also a component that promotes phase separation. The content of $Li_2O$ is preferably 0 to 20%, more preferably over 0 to 20%, still more preferably 0.3 to 15%, and particularly preferably 0.6 to 10%. If the content of $Li_2O$ is too large, the glass base material is less likely to undergo phase separation contrariwise.

$Na_2O$ is a component that decreases the melting temperature to improve meltability and also a component that promotes phase separation. The content of $Na_2O$ is preferably 0 to 20%, more preferably over 0 to 20%, still more preferably 3 to 15%, and particularly preferably 4 to 10%. If the content of $Na_2O$ is too large, the glass base material is less likely to undergo phase separation contrariwise.

$K_2O$ is a component that decreases the melting temperature to improve meltability and also a component that promotes phase separation. $K_2O$ is also a component that increases the content of $ZrO_2$ in a silica-rich phase. Therefore, by containing $K_2O$ in the glass base material, the content of $ZrO_2$ in the obtained porous glass member increases and, thus, the porous glass member can increase the alkaline resistance. The content of $K_2O$ is preferably 0 to 20%, more preferably over 0 to 20%, still more preferably 0.3 to 5%, and particularly preferably 0.8 to 3%. If the content of $K_2O$ is too large, the glass base material is less likely to undergo phase separation contrariwise.

The content of $Li_2O+Na_2O+K_2O$ is preferably 0 to 20%, more preferably over 0 to 20%, still more preferably 2 to 15%, yet still more preferably 4 to 12%, and particularly preferably 5 to 10%. If the content of $Li_2O$+$Na_2O$+$K_2O$ is too large, the glass base material is less likely to undergo phase separation.

The ratio $Na_2O/B_2O_3$ is preferably 0.1 to 0.5, more preferably 0.15 to 0.45, and particularly preferably 0.2 to 0.4. Thus, in the production process, a balance is achieved between the amount of expansion due to hydration of silica gel and the amount of contraction due to elution of $Na_2O$ from a silica-rich phase, which makes it less likely that the porous glass member breaks. In the present invention, "x/y" means a value obtained by dividing the content of x by the content of y.

The ratio $(Li_2O+Na_2O+K_2O)/B_2O_3$ is preferably 0.2 to 0.5, more preferably 0.29 to 0.45, still more preferably 0.31 to 0.42, and particularly preferably 0.33 to 0.42. Thus, in the production process, a balance is achieved between the amount of expansion due to hydration of silica gel and the amount of contraction due to elution of alkaline components from a silica-rich phase, which makes it less likely that the porous glass member breaks.

$P_2O_5$ is a component that significantly promotes phase separation. $P_2O_5$ is also a component that increases the content of $ZrO_2$ in a silica-rich phase. Therefore, by containing $P_2O_5$ in the glass base material, the content of $ZrO_2$ in the obtained porous glass member increases and, thus, the porous glass member can increase the alkaline resistance. The content of $P_2O_5$ is preferably 0 to 2%, more preferably over 0 to 2%, still more preferably 0.01 to 1.5%, and particularly preferably 0.02 to 1%. If the content of $P_2O_5$ is too large, the glass base material is likely to cause phase separation during melting. If the glass causes phase separation during melting, the phase separation condition cannot be controlled, which makes it difficult to obtain glass having clearness. In addition, if the content of $P_2O_5$ is too large, the glass base material is likely to crystallize during melting, also in which case glass having clearness is difficult to obtain.

In order to increase the content of $ZrO_2$ in the resultant porous glass member, the glass base material preferably contains at least one selected from $K_2O$ and $P_2O_5$ as an essential component.

$ZrO_2$, $TiO_2$, $Al_2O_3$, BeO, $Cr_2O_3$, $Ga_2O_3$, and $CeO_2$ are components that increase the weather resistance of the glass base material and the alkaline resistance of the porous glass member. The content of $ZrO_2+TiO_2+Al_2O_3+BeO+Cr_2O_3+Ga_2O_3+CeO_2$ is preferably over 0 to 30%, more preferably 1 to 20%, still more preferably 2 to 15%, and particularly preferably 2.5 to 12%. If the content of these components is too small, the above effects are difficult to achieve. On the other hand, if the content of these components is too large, the glass base material is likely to devitrify and less likely to undergo phase separation.

Among the above components, $ZrO_2$ is a component highly effective in increasing the weather resistance of the glass base material and the alkaline resistance of the porous glass member. The content of $ZrO_2$ is preferably over 0 to 20%, more preferably 2 to 15%, and particularly preferably 2.5 to 12%. If the content of $ZrO_2$ is too small, the above effects are difficult to achieve. On the other hand, if the content of $ZrO_2$ is too large, the glass base material is likely to devitrify and less likely to undergo phase separation. In addition, the glass is likely to crack and break in the etching process.

The ratio $P_2O_5/ZrO_2$ is preferably 0.005 to 0.5 and particularly preferably 0.01 to 0.2. If the ratio $P_2O_5/ZrO_2$ is too large, the glass base material is likely to cause phase separation and crystallization during melting, which makes it difficult to obtain glass having clearness. On the other hand, if the ratio $P_2O_5/ZrO_2$ is too small, the glass base material is less likely to undergo phase separation.

$Al_2O_3$ is a component highly effective in increasing the weather resistance and mechanical strength of the porous glass member. The content of $Al_2O_3$ is preferably 0 to 10%, more preferably 0.1 to 7%, and particularly preferably 1 to 5%. If the content of $Al_2O_3$ is too large, the melting temperature is likely to increase to decrease meltability.

$TiO_2$ is a component having the effect of increasing the etching rate of the glass base material during acidic treatment. The content of $TiO_2$ is preferably over 0 to 10%, more preferably 0.1 to 8%, and particularly preferably 0.5 to 6%. If the content of $TiO_2$ is too small, the above effect is difficult to achieve. On the other hand, if the content of $TiO_2$ is too large, the glass is likely to be colored and therefore decrease the visible light transmittance.

RO (where R represents at least one selected from among Mg, Ca, Sr, and Ba) is a component that increases the content of $ZrO_2$ in a silica-rich phase. Therefore, by containing RO in the glass base material, the content of $ZrO_2$ in the obtained porous glass member increases and, thus, the porous glass member can increase the alkaline resistance. RO is also a component that increases the weather resistance of the porous glass member. The content of RO (i.e., the total content of MgO, CaO, SrO, and BaO) is preferably 0 to 20%, more preferably 1 to 17%, still more preferably 3 to 15%, yet still more preferably 4 to 13%, even still more preferably 5 to 12%, and particularly preferably 6.5 to 12. If the content of RO is too large, the glass base material is less likely to undergo phase separation. The content of each of MgO, CaO, SrO, and BaO is preferably 0 to 20%, more preferably 1 to 17%, still more preferably 3 to 15%, yet still more preferably 4 to 13%, even still more preferably 5 to 12%, and particularly preferably 6.5 to 12. In containing at least two components selected from among MgO, CaO, SrO, and BaO in the glass base material, the total content of them is preferably 0 to 20%, more preferably 1 to 17%, still more preferably 3 to 15%, yet still more preferably 4 to 13%, even still more preferably 5 to 12%, and particularly preferably 6.5 to 12. Among these RO components, CaO is preferably used in view of its particularly large effect of increasing the alkaline resistance of the porous glass member.

The glass base material may contain, in addition to the above components, the following components.

ZnO is a component that increases the content of $ZrO_2$ in a silica-rich phase. ZnO also has the effect of increasing the weather resistance of the porous glass member. The content of ZnO is preferably 0 to 20%, more preferably 0 to 10%, and particularly preferably 0 to less than 3%. If the content of ZnO is too large, the glass base material is less likely to undergo phase separation.

The glass base material may contain $La_2O_3$, $Ta_2O_5$, $TeO_2$, $Nb_2O_5$, $Gd_2O_3$, $Y_2O_3$, $Eu_2O_3$, $Sb_2O_3$, $SnO_2$, $Bi_2O_3$, and so on, each preferably in a range of 15% or less, more preferably 10% or less, particularly preferably 5% or less, and in a range of 30% or less in total content.

PbO is a substance of environmental concern and, therefore, the glass base material is preferably substantially free of this component. Herein, "substantially free of" means that this component is not deliberately incorporated as a raw material into the glass base material and does not mean to exclude the incorporation of unavoidable impurities. Objectively, it means that the content thereof is less than 0.1%.

A glass batch formulated to give the above glass composition is melted, for example, at 1300 to 1600° C. for 4 to 12 hours. Subsequently, the molten glass is formed into a shape and then slowly cooled, for example, at 400 to 600° C. for 10 minutes to 10 hours, thus obtaining a glass base material. The shape of the obtained glass base material is not particularly limited, but is preferably a platy shape having a rectangular or circular planar figure. In order to make the obtained glass base material into a desired shape, the glass base material may be subjected to processing, such as cutting or polishing.

The obtained glass base material preferably has an aspect ratio of 2 to 1000 and particularly preferably 5 to 500. If the aspect ratio is too small, this creates a large difference in etching rate between the surface and inside of the glass base material in the process for removing (etching) a boron oxide-rich phase with an acid. Therefore, stress is likely to be produced in the inside of the porous glass member and the porous glass member is thus likely to break. On the other hand, if the aspect ratio is too large, the glass base material is difficult to handle. The aspect ratio can be calculated by the following equation.

$$\text{Aspect ratio}=(\text{base area of the glass base material})^{1/2}/(\text{thickness of the glass base material})$$

The base area and thickness of the obtained glass base material may be appropriately adjusted to give the above aspect ratio. For example, the base area is preferably 1 to 1000 $mm^2$ and particularly preferably 5 to 500 $mm^2$ and the thickness is preferably 0.1 to 1 mm and particularly preferably 0.2 to 0.5 mm.

Next, the obtained glass base material is subjected to thermal treatment to separate (spinodally separate) it into two phases: a silica-rich phase and a boron oxide-rich phase. The temperature for the thermal treatment is preferably 500 to 800° C. and particularly preferably 600 to 750° C. If the temperature for the thermal treatment is too low, the glass base material is less likely to undergo phase separation. In addition, the glass scaffold strength tends to be low, which causes cracks and breakage. On the other hand, if the temperature for the thermal treatment is too high, phase separation excessively progresses and, thus, the transmittance is likely to decrease. In addition, the pore diameter is excessively large and, thus, cracks and breakage are likely to occur. Furthermore, the glass base material is at risk of being softened and deformed. The time for the thermal treatment is preferably one minute or more, more preferably ten minutes or more, still more preferably 30 minutes or more, yet still more preferably an hour or more, and particularly preferably two hours or more. If the time for the thermal treatment is too short, the glass base material is less likely to undergo phase separation and the glass scaffold strength tends to be low. The upper limit of the time for the thermal treatment is not particularly limited. However, if the glass base material is thermally treated for a long time, phase separation excessively progresses and the clearness thus tends to decrease. Therefore, the time for the thermal treatment is preferably not more than 180 hours.

Next, the glass base material separated into two phases is immersed into an acid to remove the boron oxide-rich phase, thus obtaining a porous glass member. The acid that can be used is hydrochloric acid or nitric acid. These acids may be used in mixture. The concentration of the acid is preferably 0.1 to 5 N and particularly preferably 0.5 to 3 N. The time for immersion in the acid is preferably an hour or more, more preferably 10 hours or more, and particularly preferably 20 hours or more. If the time for immersion is too short, etching is insufficient, which makes it difficult to obtain a porous glass member having desired interconnected pores. The upper limit of the time for immersion is not particularly limited, but it is actually not more than 100 hours. The temperature during immersion is preferably 20° C. or higher, more preferably 25° C. or higher, and particularly preferably 30° C. or higher. If the temperature during immersion is too low, etching is insufficient, which makes it difficult to obtain a porous glass member having desired interconnected pores. The upper limit of the temperature during immersion is not particularly limited, but it is actually not higher than 95° C.

In the step of separating the glass base material into phases, a silica-containing layer (a layer containing silica in a content of approximately 80% by mole or more) may be formed in the uppermost portion of the surface of the glass base material. The silica-containing layer is difficult to remove with an acid. Therefore, if a silica-containing layer has been formed, the glass base material separated into phases is cut or polished to remove the silica-containing layer and then immersed into an acid. In this way, the boron oxide-rich phase can be more easily removed. Alternatively, in order to remove the silica-containing layer, the glass base material separated into phases may be immersed into hydrofluoric acid for a short time.

Furthermore, it is preferred to remove residual $ZrO_2$ colloid and $SiO_2$ colloid in the pores of the obtained porous glass member.

$ZrO_2$ colloid can be removed, for example, by immersing the glass base material into sulfuric acid. The concentration of sulfuric acid is preferably 0.1 to 5 N and particularly preferably 1 to 5 N. The time for immersion into sulfuric acid is preferably an hour or more and particularly preferably 10 hours or more. If the time for immersion is too short, $ZrO_2$ colloid is less likely to be removed. The upper limit of the time for immersion is not particularly limited, but it is actually not more than 100 hours. The temperature during immersion is preferably 20° C. or higher, more preferably 25° C. or higher, and particularly preferably 30° C. or higher. If the temperature during immersion is too low, $ZrO_2$ colloid is less likely to be removed. The upper limit of the temperature during immersion is not particularly limited, but it is actually not higher than 95° C.

$SiO_2$ colloid can be removed, for example, by immersing the glass base material into an aqueous alkaline solution. Examples of the aqueous alkaline solution that can be used include sodium hydroxide aqueous solution and potassium hydroxide aqueous solution. These aqueous alkaline solutions may be used in mixture. The time for immersion into the aqueous alkaline solution is preferably 10 minutes or more and particularly preferably 30 minutes or more. If the time for immersion is too short, $SiO_2$ colloid is less likely to be removed. The upper limit of the time for immersion is not particularly limited, but it is actually not more than 100 hours. The temperature during immersion is preferably 15° C. or higher and particularly preferably 20° C. or higher. If the temperature during immersion is too low, $SiO_2$ colloid is less likely to be removed. The upper limit of the temperature during immersion is not particularly limited, but it is actually not higher than 95° C.

(Sensor Element)

A sensor element according to the present invention includes: the porous glass member according to the present invention; and a functional pigment supported in pores in the porous glass member. The functional pigment is a pigment that causes changes, such as color development, discoloration, and decolorization, by application of light, heat, electric field, magnetic field, pressure or other external energies thereto or chemical reactions, and is widely used for display devices, energy conversion materials, recording materials, sensing materials, and so on. By supporting the functional pigment in the inside of the porous glass member, the porous glass member can be used as a sensor element. Functional pigments are often unstable in the atmospheric environment and likely to cause problems, such as oxidation. However, by supporting such a functional pigment in the inside of the porous glass member, the reaction with the outside air can be reduced. Alternatively, by supporting the functional pigment in the inside of a porous glass member having a high transmittance in a wide wavelength range, the optical properties of the functional pigment can be efficiently utilized.

Examples of the functional pigment include vanillin and vanillin derivatives. Vanillin is widely used as a flavoring for foods, perfumes, cigarettes, and so on from a long time ago. On the other hand, vanillin is used also as a pigment in the chemical industry filed and widely used also as a coloring reagent for thin-layer chromatography because of its high reactivity. Vanillin and vanillin derivatives exhibit light absorption in a wavelength range of 400 nm or less and, upon reaction with an aldehyde-based gas, such as nonanal, change their absorbance at 350 to 450 nm near the above wavelength range, particularly at 400 to 450 nm. By measuring the change in absorbance, the aldehyde-based gas can be detected. Aldehyde-based gases, such as nonanal, are known to be contained at high concentration in the breaths of lung cancer patients. For this reason, a sensor element formed by supporting vanillin or a vanillin derivative in the inside of a porous glass member can be used as a gas sensor element for lung cancer diagnosis.

Vanillin and vanillin derivatives react with the aldehyde-based gas under an alkaline compound (such as sodium hydroxide) serving as a catalyst. Therefore, the porous glass member according to the present invention is preferably used as a gas sensor element in a state where an alkaline compound is, together with vanillin or a vanillin derivative, supported in the inside of the porous glass member.

Examples

Hereinafter, the present invention will be described with reference to examples, but is not limited to these examples.

Table 1 shows examples (Sample Nos. 1 to 20) of the present invention.

TABLE 1

| | | No. 1 | No. 2 | No. 3 | No. 4 | No. 5 | No. 6 | No. 7 |
|---|---|---|---|---|---|---|---|---|
| | GLASS COMPOSITION (% by mass) | | | | | | | |
| POROUS GLASS BASE MATERIAL | $SiO_2$ | 50.9 | 53.6 | 54.7 | 53.6 | 53.6 | 54.7 | 51.4 |
| | $Al_2O_3$ | 3.1 | 3.1 | 3.1 | 3.1 | 3.1 | 3.1 | 2.6 |
| | $B_2O_3$ | 21.4 | 21.4 | 21.5 | 21.4 | 21.4 | 21.5 | 17.9 |
| | $Na_2O$ | 7.0 | 6.1 | 7.1 | 6.1 | 6.1 | 7.1 | 5.4 |
| | CaO | 8.2 | 8.2 | 7.4 | 8.2 | 8.2 | 7.4 | 7.6 |
| | $ZrO_2$ | 5.7 | 5.7 | 5.7 | 5.7 | 5.7 | 5.7 | 11.0 |
| | $K_2O$ | | 1.4 | | 1.4 | 1.4 | | 1.2 |
| | $P_2O_5$ | | 0.5 | 0.5 | 0.5 | 0.5 | 0.5 | 0.8 |
| | $TiO_2$ | 3.7 | | | | | | 2.1 |
| POROUS GLASS MEMBER | $Al_2O_3$ | 2.2 | 2.6 | 2.4 | 3.2 | 3.6 | 3.5 | 5.0 |
| | $SiO_2$ | 90.9 | 90.1 | 90.6 | 89.4 | 89.2 | 89.5 | 83.7 |
| | $P_2O_5$ | 0.0 | 0.3 | 0.5 | 0.4 | 0.4 | 0.4 | 0.9 |
| | $TiO_2$ | 0.9 | | | | | | 0.5 |
| | $ZrO_2$ | 6.0 | 7.0 | 6.5 | 7.0 | 6.8 | 6.6 | 9.9 |
| | $ZrO_2 + TiO_2 + Al_2O_3$ | 9.1 | 9.6 | 8.9 | 10.2 | 10.4 | 10.1 | 15.4 |
| | CRACK RESISTANCE | ○ | ○ | ○ | ○ | ○ | ○ | ◎ |
| | PORE DIAMETER (nm) | 40 | 27 | 35 | 34 | 37 | 40 | 35 |
| | POROSITY (%) | 77 | 57 | 64 | 58 | 52 | 45 | 68 |
| | SCAFFOLD DIAMETER (nm) | 21 | 22 | 24 | 26 | 32 | 4 | 22 |
| | TRANSMITTANCE (%) | | | | | | | |
| | 350 nm | 22 | 10 | 10 | 2 | 0.2 | 0.03 | 15 |
| | 400 nm | 38 | 21 | 29 | 11 | 2 | 0.1 | 38 |
| | 450 nm | 49 | 31 | 45 | 24 | 14 | 0.4 | 56 |
| | 500 nm | 55 | 37 | 56 | 35 | 31 | 4 | 69 |
| | 600 nm | 63 | 45 | 68 | 50 | 60 | 30 | 83 |
| | 700 nm | 67 | 49 | 73 | 58 | 74 | 55 | 90 |
| | 800 nm | 70 | 52 | 76 | 63 | 82 | 70 | 93 |
| | ALKALINE RESISTANCE | ○ | ○ | ○ | ○ | ○ | ○ | ◎ |

TABLE 2

| | | No. 8 | No. 9 | No. 10 | No. 11 | No. 12 | No. 13 | No. 14 |
|---|---|---|---|---|---|---|---|---|
| | GLASS COMPOSITION (% by mass) | | | | | | | |
| POROUS GLASS BASE MATERIAL | $SiO_2$ | 53.1 | 54.2 | 52.2 | 51.9 | 51.6 | 53.1 | 53.4 |
| | $Al_2O_3$ | 2.5 | 2.5 | 2.9 | 3.2 | 3.5 | 2.6 | 2.6 |
| | $B_2O_3$ | 17.1 | 16.7 | 17.4 | 17.4 | 17.4 | 16.9 | 16.7 |
| | $Na_2O$ | 5.1 | 5.0 | 5.2 | 5.2 | 5.2 | 5.1 | 5.0 |
| | CaO | 7.2 | 7.4 | 7.4 | 7.4 | 7.4 | 7.4 | 7.4 |
| | $ZrO_2$ | 11.1 | 11.1 | 11.0 | 11.0 | 11.0 | 11.1 | 11.1 |
| | $K_2O$ | 1.1 | 1.1 | 1.1 | 1.1 | 1.1 | 1.1 | 1.1 |

TABLE 2-continued

| | | No. 8 | No. 9 | No. 10 | No. 11 | No. 12 | No. 13 | No. 14 |
|---|---|---|---|---|---|---|---|---|
| | $P_2O_5$ | 0.8 | 0.8 | 0.8 | 0.8 | 0.8 | 0.8 | 0.8 |
| | $TiO_2$ | 2.0 | 1.2 | 2.0 | 2.0 | 2.0 | 1.9 | 1.9 |
| POROUS | $Al_2O_3$ | 3.0 | 1.8 | 2.5 | 2.9 | 2.5 | 2.4 | 2.8 |
| GLASS | $SiO_2$ | 84.3 | 90.7 | 87.0 | 86.5 | 86.0 | 85.5 | 88.2 |
| MEMBER | $P_2O_5$ | 1.4 | 0.2 | 0.5 | 0.7 | 1.5 | 1.8 | 0.3 |
| | $TiO_2$ | 1.0 | 0.4 | 0.8 | 0.8 | 0.7 | 0.7 | 0.7 |
| | $ZrO_2$ | 10.3 | 6.9 | 9.2 | 9.1 | 9.3 | 9.6 | 8.0 |
| | $ZrO_2 + TiO_2 + Al_2O_3$ | 14.3 | 9.1 | 12.5 | 12.8 | 12.5 | 12.7 | 11.5 |
| | CRACK RESISTANCE | ◎ | ◎ | ◎ | ◎ | ◎ | ◎ | ◎ |
| | PORE DIAMETER (nm) | 33 | 31 | 29 | 28 | 26 | 30 | 28 |
| | POROSITY (%) | 66 | 64 | 63 | 57 | 57 | 64 | 61 |
| | SCAFFOLD DIAMETER (nm) | 21 | 21 | 20 | 22 | 21 | 21 | 20 |
| | TRANSMITTANCE (%) | | | | | | | |
| | 350 nm | 27 | 17 | 19 | 5 | 4 | 24 | 5 |
| | 400 nm | 48 | 39 | 41 | 19 | 15 | 47 | 20 |
| | 450 nm | 63 | 56 | 59 | 36 | | 64 | 39 |
| | 500 nm | 72 | 68 | 72 | 53 | 47 | 75 | 55 |
| | 600 nm | 82 | 80 | 86 | 75 | 69 | 87 | 77 |
| | 700 nm | 86 | 85 | 92 | 86 | 81 | 92 | 87 |
| | 800 nm | 89 | 88 | 96 | 93 | 88 | 94 | 94 |
| | ALKALINE RESISTANCE | ◎ | ○ | ◎ | ◎ | ◎ | ◎ | ◎ |

TABLE 3

| | | No. 15 | No. 16 | No. 17 | No. 18 | No. 19 | No. 20 |
|---|---|---|---|---|---|---|---|
| | GLASS COMPOSITION (% by mass) | | | | | | |
| BASE | $SiO_2$ | 52.8 | 52.6 | 52.2 | 52.1 | 53.3 | 52.7 |
| MATERIAL | $Al_2O_3$ | 2.6 | 2.6 | 2.6 | 2.6 | 3.1 | 2.6 |
| POROUS | $B_2O_3$ | 17.1 | 17.3 | 17.5 | 17.5 | 16.7 | 17.7 |
| GLASS | $Na_2O$ | 5.1 | 5.2 | 5.3 | 5.4 | 5.1 | 5.2 |
| | CaO | 7.4 | 7.4 | 7.4 | 7.4 | 8.1 | 7.0 |
| | $ZrO_2$ | 11.1 | 11.0 | 11.0 | 11.0 | 11.1 | 11.0 |
| | $K_2O$ | 1. 1 | 1.1 | 1.2 | 1.2 | 1.1 | 1.1 |
| | $P_2O_5$ | 0.8 | 0.8 | 0.8 | 0.8 | 0.9 | 0.8 |
| | $TiO_2$ | 2.0 | 2.0 | 2.0 | 2.0 | 0.6 | 1.9 |
| POROUS | $Al_2O_3$ | 2.4 | 2.4 | 1.8 | 2.0 | 2.4 | 4.0 |
| GLASS | $SiO_2$ | 86.4 | 86.8 | 85.6 | 86.6 | 83.7 | 83.1 |
| MEMBER | $P_2O_5$ | 1.3 | 1.2 | 1.5 | 1.3 | 2.1 | 1.0 |
| | $TiO_2$ | 0.6 | 0.8 | 0.7 | 0.8 | 0.3 | 0.9 |
| | $ZrO_2$ | 9.3 | 8.8 | 10.4 | 9.3 | 11.5 | 11.0 |
| | $ZrO_2 + TiO_2 + Al_2O_3$ | 12.3 | 12.0 | 12.9 | 12.1 | 14.2 | 15.9 |
| | CRACK RESISTANCE | ◎ | ◎ | ◎ | ◎ | ◎ | ◎ |
| | PORE DIAMETER (nm) | 28 | 31 | 34 | 34 | 28 | 47 |
| | POROSITY (%) | 67 | 64 | 67 | 68 | 65 | 42 |
| | SCAFFOLD DIAMETER (nm) | 18 | 21 | 22 | 21 | 19 | 51 |
| | TRANSMITTANCE (%) | | | | | | |
| | 350 nm | 31 | 22 | 10 | 12 | 24 | 0 |
| | 400 nm | 52 | 45 | 29 | 31 | 45 | 0 |
| | 450 nm | 67 | 63 | 48 | 48 | 61 | 0 |
| | 500 nm | 77 | 75 | 62 | 62 | 71 | 0 |
| | 600 nm | 88 | 88 | 78 | 77 | 82 | 6 |
| | 700 nm | 93 | 94 | 86 | 84 | 87 | 20 |
| | 800 nm | 95 | 97 | 90 | 87 | 89 | 30 |
| | ALKALINE RESISTANCE | ◎ | ◎ | ◎ | ◎ | ◎ | ◎ |

Raw materials formulated to give each of the porous glass base material compositions in the tables were put into a platinum crucible and then melted therein at 1400 to 1500° C. for four hours. Next, the molten glass was poured onto a metallic plate to form it into a platy shape and then slowly cooled at 540 to 580° C. for 30 minutes, thus obtaining a glass base material.

The obtained glass base material was thermally treated in an electric furnace at 650 to 700° C. for 10 minutes to 24 hours to undergo phase separation. The glass base material after undergoing phase separation was cut and polished to a size of 5 mm×5 mm×0.5 mm. Next, the glass base material was immersed into 1 N nitric acid (at 95° C.) for 48 hours, then washed with ion-exchange water, subsequently immersed into 3 N sulfuric acid (at 95° C.) for 48 to 96 hours, then washed with ion-exchange water, further immersed into 0.5 N sodium hydroxide aqueous solution (at room temperature) for 3 to 8 hours, and then washed with ion-exchange water. In this manner, a porous glass member was obtained.

When the cross sections of the obtained porous glass members were observed with an FE-SEM (field-emission-type scanning electron microscope SU-8220 manufactured by Hitachi, Ltd.), all the glass members had a skeleton structure based on spinodal phase separation.

Ten samples for each composition were produced and evaluated in terms of crack resistance in the following manner. Specifically, when the number of samples neither cracked nor broken in ten samples for each composition was six or more, five to two, and one or less, the composition was evaluated as "◎", "o", and "x", respectively.

Next, the porous glass members were analyzed with an EDX (an energy dispersive X-ray analyzer EX-370X-MaxN150 manufactured by Horiba, Ltd.) to measure the respective compositions of the porous glass members. The analysis was conducted on three points of a central portion of the cross section of each porous glass member and the average of the three measured values was adopted.

The pore diameter was measured with a pore size distribution measurement device (QUADRASORB SI manufactured by Anton Paar GmbH). The median value of the obtained pore diameter distribution was adopted as the pore diameter. The porosity was determined, as in the equation described previously, from the pore volume ($cm^3$) and the scaffold volume ($cm^3$) of the porous glass member. In calculating the scaffold volume ($cm^3$) of the porous glass member, 2.5 ($g/cm^3$), which was the density of the scaffold of the porous glass member, was used.

The scaffold diameter was calculated from the obtained pore diameter and porosity using the equation described previously.

The light transmittance was measured with a spectrophotometer (UH-4150 manufactured by Hitachi High-Tech Science Corporation).

Furthermore, each porous glass member was evaluated in terms of alkaline resistance in the following manner. The porous glass member was immersed for 20 minutes into 0.5 N sodium hydroxide aqueous solution held at 80° C. With respect to the amount of weight reduction per specific surface area between before and after the immersion, porous glass members having an amount of weight reduction of less than 1 $mg/m^2$ was evaluated as "◎", porous glass members having an amount of weight reduction of not less than 1 $mg/m^2$ and less than 3 $mg/m^2$ were evaluated as "o", and porous glass members having an amount of weight reduction of not less than 3 $mg/m^2$ were evaluated as "x". The specific surface area was measured with QUADRASORB SI manufactured by Quantachrome Instruments.

As indicated in Table 1, Samples Nos. 1 to 20, which were Examples of the present invention, had a pore diameter of 26 to 47 nm, a scaffold diameter of 18 to 51 nm, and a porosity of 42 to 77%. In terms of light transmittance, Samples Nos. 1 to 20 exhibited over 1% at any one of wavelengths of 350 to 800 nm and, particularly, Samples Nos. 1 to 19 exhibited a light transmittance of 4% or more in a wavelength range 500 to 800 nm. In addition, Samples Nos. 1 to 19 exhibited, in a wavelength range of 350 to 800 nm, a light transmittance of 2% or more and therefore had an excellent light transmission property. Particularly, Samples Nos. 8, 10, 13, 15, 16, and 19 exhibited, in a wavelength range of 400 to 800 nm, a light transmittance of 40% or more and therefore had an excellent light transmission property.

The invention claimed is:

1. A porous glass member containing, in terms of % by mass, 50 to 98% $SiO_2$, 2 to 30% $ZrO_2$, 0 to 20% $Al_2O_3$, having a scaffold diameter of 1 to 45 nm, and having a light transmittance of over 1% at any one of wavelengths from 200 to 2600 nm at a thickness of 0.5 mm.

2. The porous glass member according to claim 1, having a light transmittance of over 1% at any one of wavelengths from 350 to 800 nm at a thickness of 0.5 mm.

3. The porous glass member according to claim 1, having a light transmittance of over 1% at any one of wavelengths from 350 to 450 nm at a thickness of 0.5 mm.

4. The porous glass member according to claim 1, having a light transmittance of 0.1% or more at a wavelength of 400 nm at a thickness of 0.5 mm.

5. The porous glass member according to claim 1, having a pore diameter of 1 to 50 nm.

6. The porous glass member according to claim 1, being applied for sensing using an absorbance change at a wavelength of 350 to 450 nm.

7. A sensor element comprising: the porous glass member according to claim 1; and a functional pigment supported in pores in the porous glass member.

8. The sensor element according to claim 7, wherein the functional pigment is vanillin and/or a vanillin derivative.

* * * * *